(12) United States Patent
Sakon et al.

(10) Patent No.: US 9,382,942 B2
(45) Date of Patent: Jul. 5, 2016

(54) MOTOR

(71) Applicant: Panasonic Intellectual Property Management Co., Ltd., Osaka (JP)

(72) Inventors: Syouzou Sakon, Osaka (JP); Kazuo Toya, Osaka (JP); Yasuharu Uchida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/432,753

(22) PCT Filed: Sep. 20, 2013

(86) PCT No.: PCT/JP2013/005574
§ 371 (c)(1),
(2) Date: Apr. 1, 2015

(87) PCT Pub. No.: WO2014/054236
PCT Pub. Date: Apr. 10, 2014

(65) Prior Publication Data
US 2015/0275962 A1    Oct. 1, 2015

(30) Foreign Application Priority Data

Oct. 5, 2012 (JP) ................. 2012-222823

(51) Int. Cl.
*F16C 25/08* (2006.01)
*F16C 19/06* (2006.01)
(Continued)

(52) U.S. Cl.
CPC .............. *F16C 25/083* (2013.01); *F16C 19/06* (2013.01); *F16C 19/163* (2013.01); *F16C 27/06* (2013.01);
(Continued)

(58) Field of Classification Search
CPC ......... F16C 25/083; F16C 27/08; H02K 5/14; H02K 5/26; Y10S 384/93; F16F 1/324; F16F 1/02; F16F 1/34; F16F 11/12
USPC ......... 384/490, 513, 517–518, 535, 611, 620, 384/626, 903; 310/89, 90; 417/415; 267/160–161
See application file for complete search history.

(56) References Cited

U.S. PATENT DOCUMENTS 2,922,000 A * 1/1960 Larsh ............... H01H 35/10
200/80 R
4,672,250 A * 6/1987 Seitz ............... F16C 19/54
310/67 R (Continued)

FOREIGN PATENT DOCUMENTS

EP    0 490 845    6/1992
EP    0 909 895    4/1999
(Continued)

OTHER PUBLICATIONS

International Search Report of PCT application No. PCT/JP2013/005574 dated Dec. 10, 2013.
(Continued)

*Primary Examiner* — Marcus Charles
(74) *Attorney, Agent, or Firm* — Hamre, Schumann, Mueller & Larson, P.C.

(57) ABSTRACT

A motor which includes: inner ring having upper end surface, outer ring, and balls between inner ring and outer ring. Pressurizing spring, into which rotary shaft is inserted, is located between core and bearing, and provides bias forces in the axial direction of rotary shaft. Outer ring is pressed to fit into bearing holding part. Inner ring is fitted onto rotary shaft with gap therebetween. Upper end surface of inner ring is in contact with pressurizing spring. Pressurizing spring applies the bias forces of different strengths onto a surface in which upper end surface contacts with pressurizing spring, along a circumferential direction with the axial direction as a center.

7 Claims, 6 Drawing Sheets

(51) Int. Cl.
*F16C 11/12* (2006.01)
*F16F 1/34* (2006.01)
*F16C 19/16* (2006.01)
*F16C 27/06* (2006.01)
*F16C 35/063* (2006.01)
*H02K 5/173* (2006.01)
*F16F 1/32* (2006.01)
*H02K 5/24* (2006.01)

(52) U.S. Cl.
CPC ............ F16C 35/063 (2013.01); H02K 5/1732 (2013.01); *F16F 1/324* (2013.01); *F16F 1/34* (2013.01); *H02K 5/24* (2013.01)

(56) References Cited

U.S. PATENT DOCUMENTS

| | | | | |
|---|---|---|---|---|
| 4,924,127 | A * | 5/1990 | Boireau | F16C 23/045 384/209 |
| 5,237,228 | A * | 8/1993 | Fries | H02K 5/1732 384/223 |
| 5,811,902 | A * | 9/1998 | Sato | B60T 8/4022 384/626 |
| 6,024,177 | A * | 2/2000 | Winebrenner | A62C 31/28 169/37 |
| 6,056,519 | A * | 5/2000 | Morita | F04B 39/0027 267/161 |
| 2005/0012417 | A1* | 1/2005 | Fasterding | H02K 5/1732 384/611 |
| 2005/0285454 | A1* | 12/2005 | Choi | H02K 33/16 310/14 |
| 2007/0102228 | A1* | 5/2007 | Shiina | B62D 5/0409 180/444 |
| 2007/0257569 | A1 | 11/2007 | Heyder | |
| 2012/0045158 | A1 | 2/2012 | Mashino et al. | |

FOREIGN PATENT DOCUMENTS

| | | |
|---|---|---|
| JP | 58-193852 U | 12/1983 |
| JP | 2000-308305 | 11/2000 |
| JP | 2002336785 A * | 11/2002 |
| JP | 2008-511278 | 4/2008 |

OTHER PUBLICATIONS

The Extended European Search Report dated Apr. 21, 2016 for the related European Patent Application No. 13843685.2, 9 pages.

* cited by examiner

MOTOR

TECHNICAL FIELD

The present invention relates to a motor using ball bearings.

BACKGROUND ART

In an electric motor or the like using a ball bearing, reducing noise generated by the ball bearing is a particularly important subject. Hereinafter, the ball bearing is referred to simply as the bearing. As one of the conventional means for reducing such noises, Patent Literature 1 proposes a motor featuring a reduced noise that is achieved by suppressing its backlashes which is caused by a bearing in the direction of its rotary shaft, for example.

An outline of the means applied to conventional motors will be described with reference to FIG. 7. FIG. 7 is an enlarged cross-sectional view of a principal part of a conventional motor. As shown in FIG. 7, rotor 28 is equipped with core 24 and rotary shaft 23 fixed to core 24. Bearing 21 is attached to the end portion on the yoke 29 side of rotary shaft 23.

Bearing 21 includes inner ring 21a, outer ring 21b, and balls 21c. Outer ring 21b included in bearing 21 is pressed to fit into bearing holding part 29a included in yoke 29, and is held there. Inner ring 21a included in bearing 21 is fitted onto rotary shaft 23 with a gap therebetween. Between core 24 included in rotor 28 and inner ring 21a included in bearing 21, rotary shaft 23 is inserted into washer 22.

Washer 22 is disposed, with the washer being compressed in the axial direction of rotary shaft 23. In FIG. 7, the axial direction of rotary shaft 23 is the up-and-down direction of the figure. Inner ring 21a is applied with downward bias force Fa by washer 22, as shown in FIG. 7. Over the entire perimeter of a surface where washer 22 is in contact with inner ring 21a, inner ring 21a is uniformly applied with bias force Fa by washer 22. Bias force Fa applied by washer 22 pressurizes inner ring 21a included in bearing 21, in the axial direction. This pressurization eliminates gaps between inner ring 21a and balls 21c and gaps between balls 21c and outer ring 21b. As a result, the noise due to the backlashes of bearing 21 is suppressed, and the lifetime of bearing 21 is lengthened.

CITATION LIST

Patent Literature

PTL 1: Japanese Patent Unexamined Publication No. 2000-308305

SUMMARY OF THE INVENTION

A motor according to the present invention includes a rotor, a bearing, a pressurizing spring, and a yoke. The rotor includes a core and a rotary shaft fixed to the core, and the rotary shaft has the axial center of the core as an axial center thereof. The bearing includes an inner ring having an upper end surface in the direction in which the core is located, an outer ring, and balls located between the inner ring and the outer ring. The pressurizing spring, into which the rotary shaft is inserted, is located between the core and the bearing, and provides a bias force in the axial direction of the rotary shaft. The yoke includes a bearing holding part to hold the bearing. The yoke rotatably holds the rotor via the bearing.

The outer ring is pressed to fit into the bearing holding part. The inner ring is fitted onto the rotary shaft with a gap therebetween. The inner ring is in contact with the pressurizing spring at the upper end surface of the inner ring. The pressurizing spring applies different bias forces to the upper end surface.

DESCRIPTION OF EMBODIMENTS

The present invention is intended to provide a motor, according to embodiments to be described later, in which a bearing is pressurized appropriately. The pressurization reduces noise and vibration of the motor which are generated by the bearing.

Figure 7:
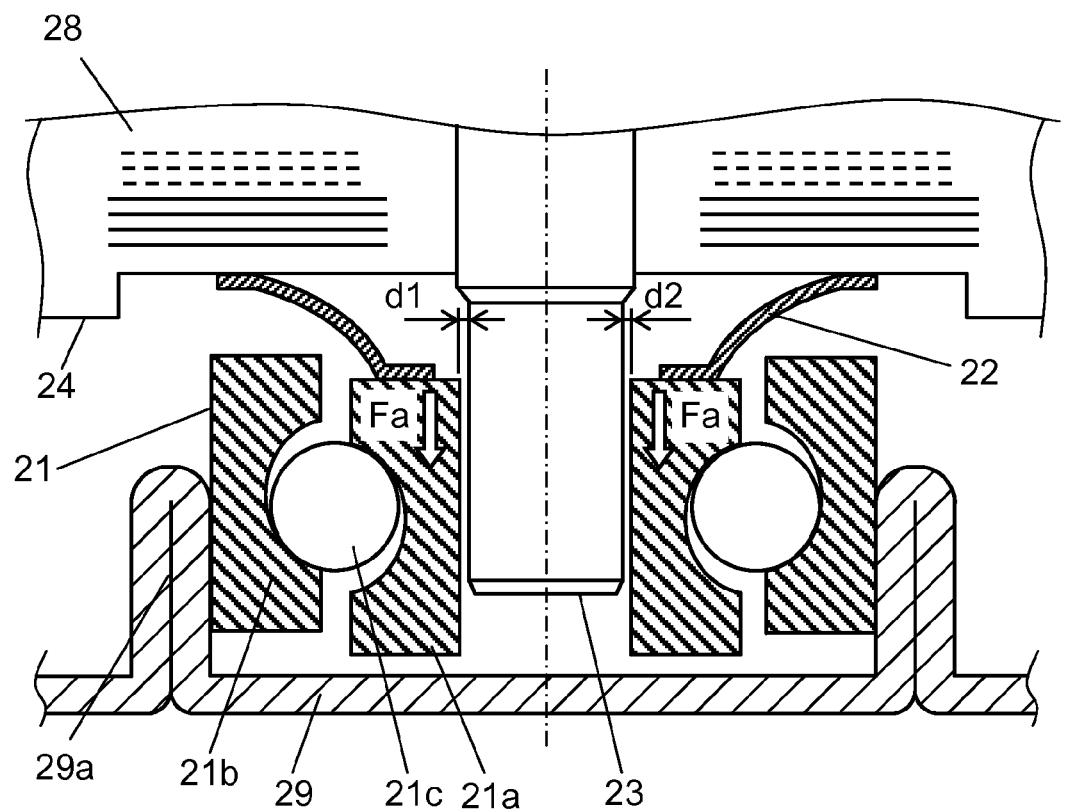
FIG. 7 is an enlarged cross-sectional view of a principal part of a conventional motor.

In other words, conventional motors have had the following problem. That is, in the motor described in Patent Literature 1, for example, an inner ring included in its bearing is fitted onto its rotary shaft with a gap therebetween. Over the entire perimeter of a surface where the washer is in contact with the inner ring, the inner ring is uniformly applied with bias force Fa by the washer. Accordingly, a slight gap exists between the outer peripheral surface of the rotary shaft and the inner peripheral surface of the inner ring. The gap is shown in FIG. 7, indicated by gaps d1 and d2.

Here, when the rotary shaft's cross-section orthogonal to the axial direction is arranged to be eccentric, the gap becomes nonuniform. Accordingly, the outer peripheral surface of the rotary shaft and the inner peripheral surface of the inner ring are in sliding contact with each other. Therefore, the noise and vibration accompanying the rotation of the rotor cannot be suppressed sufficiently.

Hereinafter, detailed descriptions will be made regarding embodiments of the present invention, which exhibit particularly outstanding advantages, with reference to the accompanying drawings.

It is noted, however, that the following descriptions are nothing more than examples for embodying the present invention, and are in no way intended to limit the technical scope of the invention.

First Exemplary Embodiment

A configuration of a motor according to a first embodiment of the present invention will be described, with reference to FIGS. 1 to 6.

Figure 1:
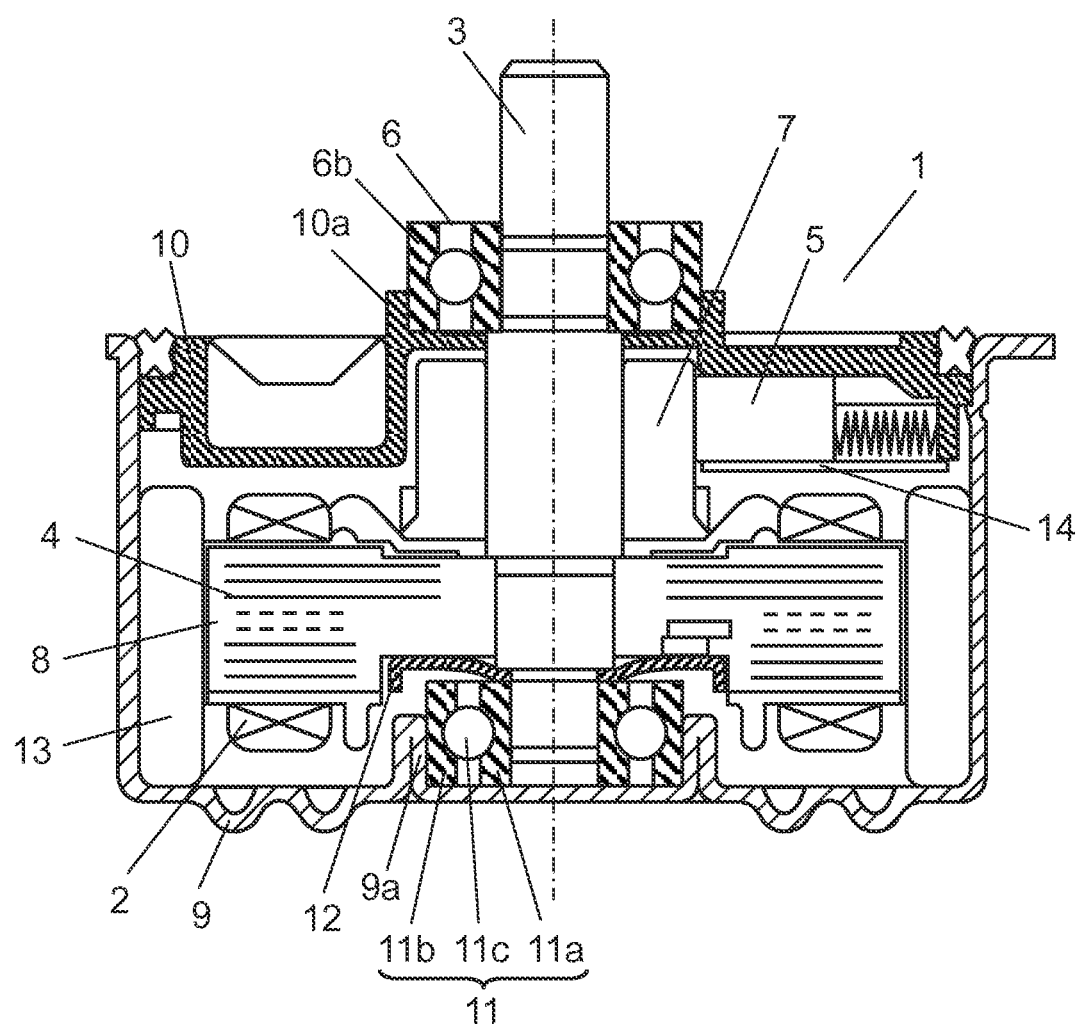
FIG. 1 is a cross-sectional view of a motor according to a first embodiment of the present invention.
Figure 2:
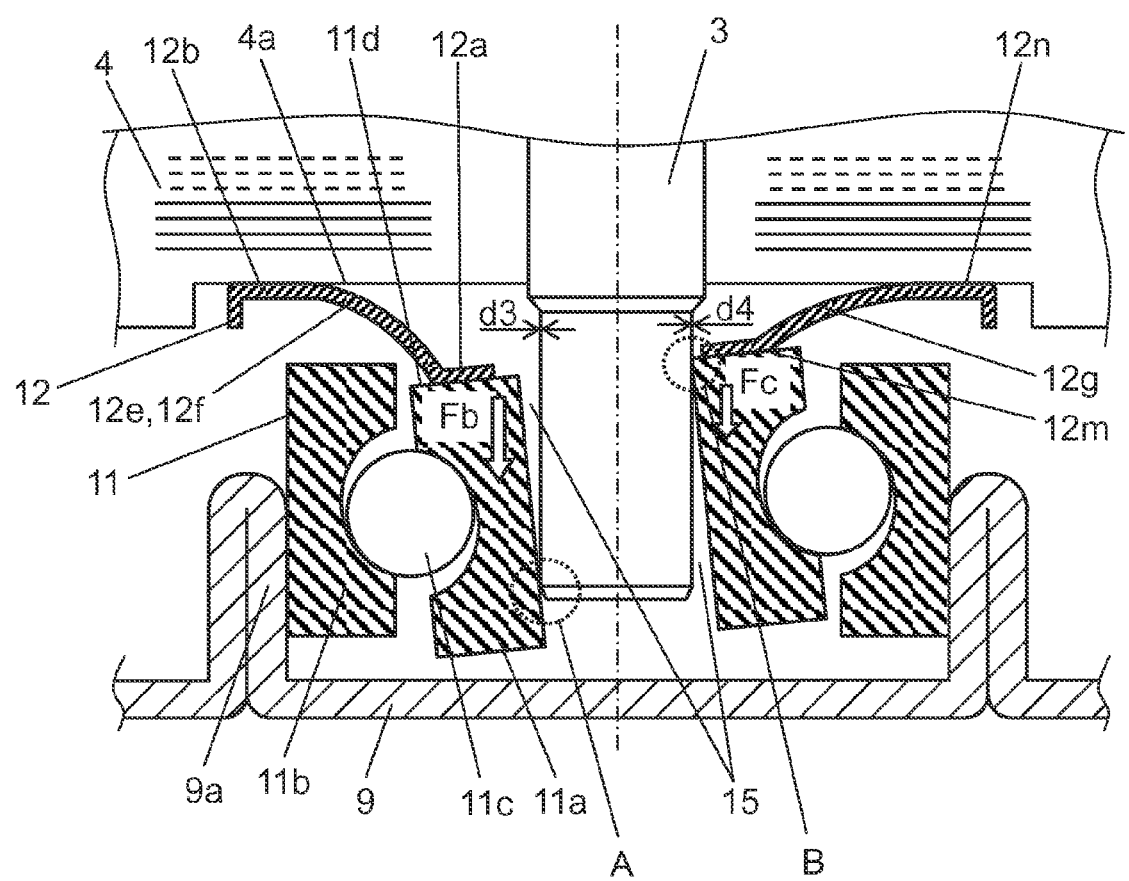
FIG. 2 is an enlarged cross-sectional view of a principal part of the motor.
Figure 3:
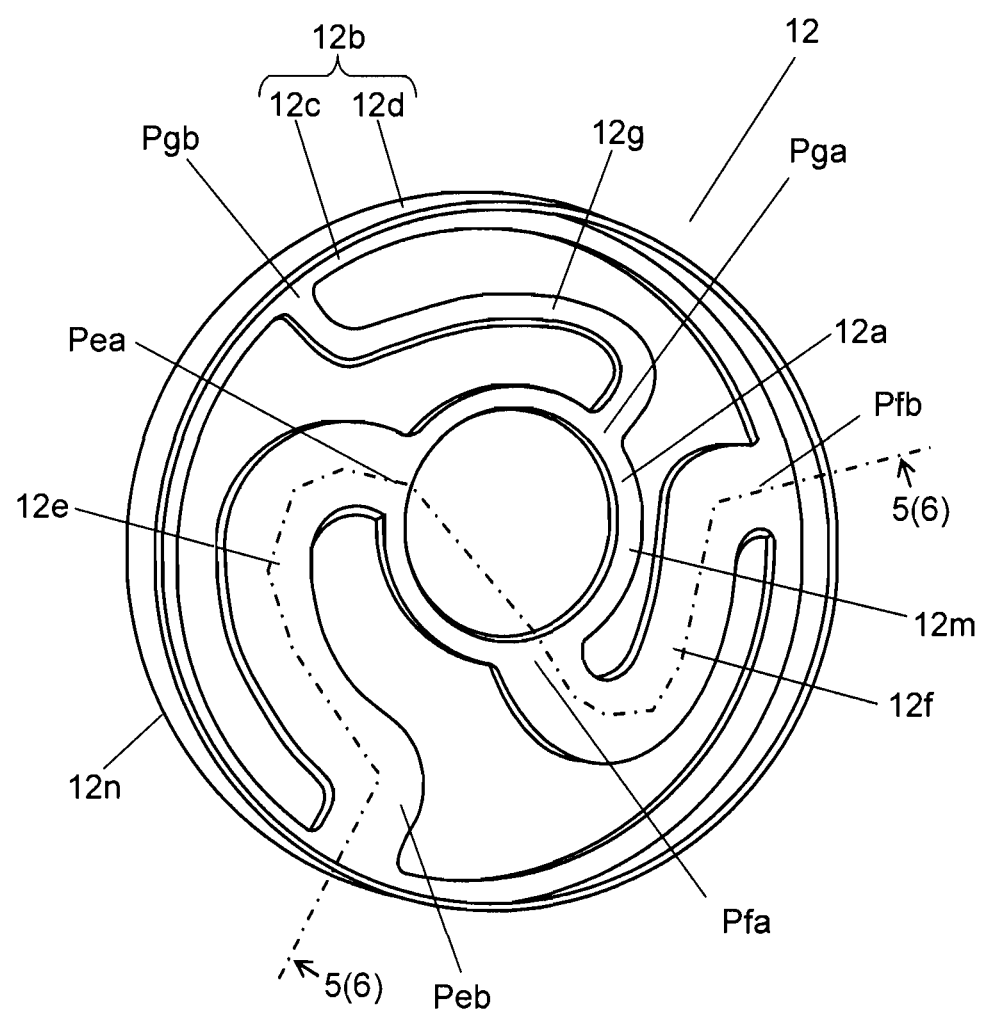
FIG. 3 is a perspective view of a washer of the motor.
Figure 4:
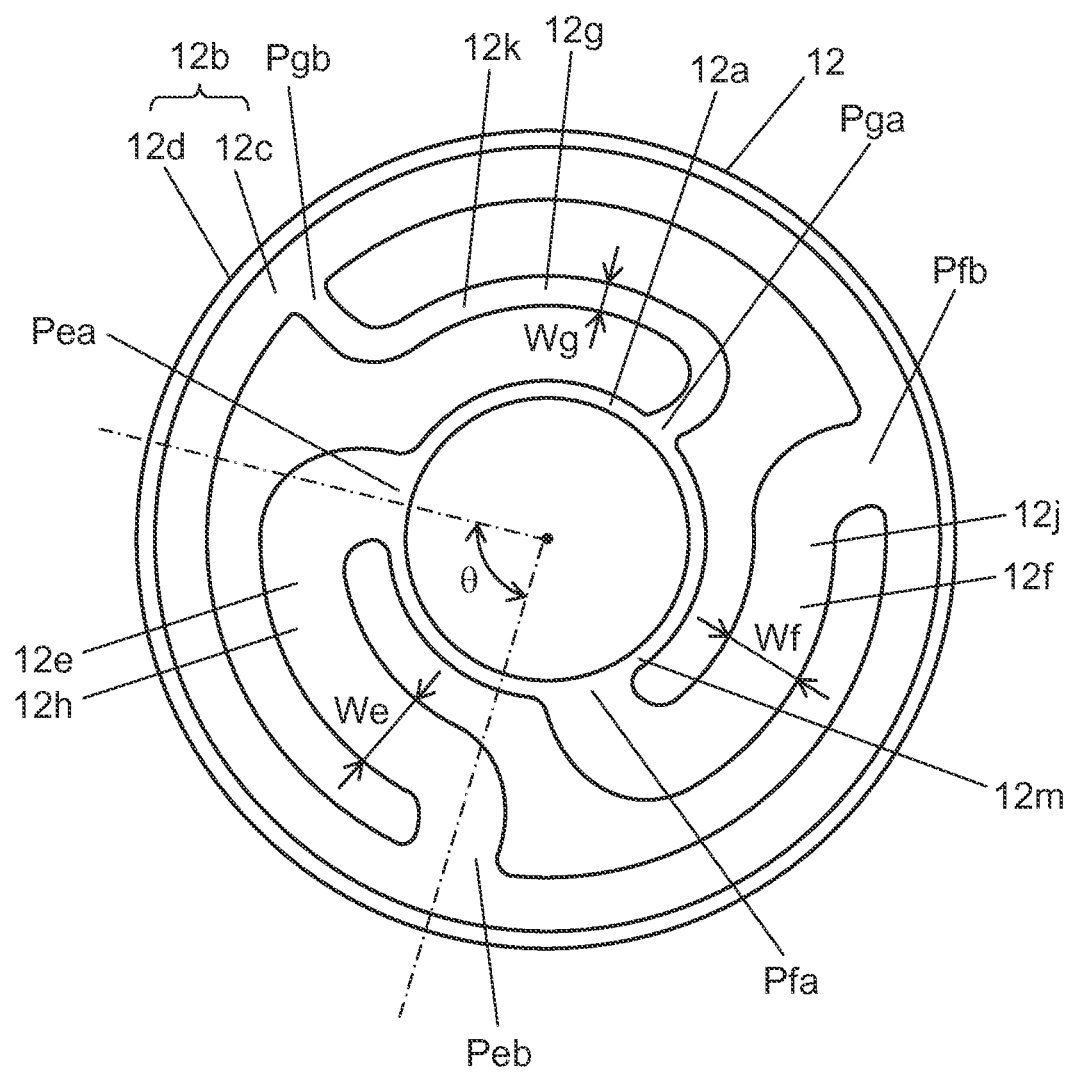
FIG. 4 is a plan view of the washer of the motor.
Figure 5:
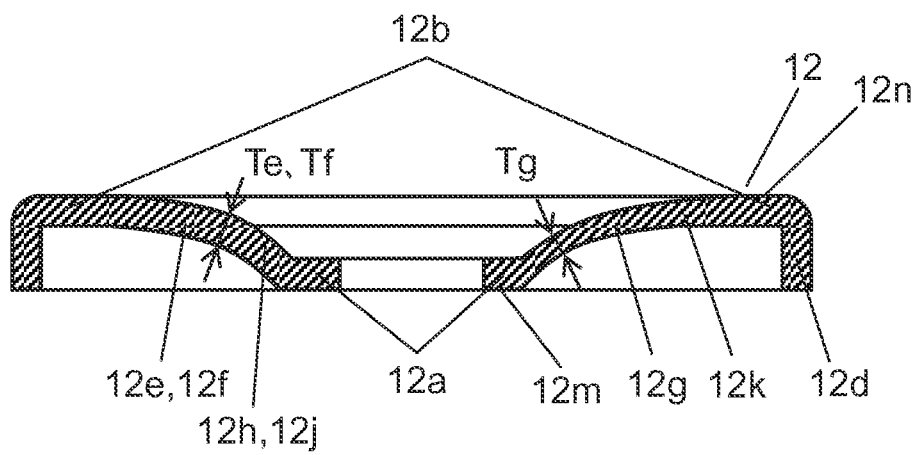
FIG. 5 is a conceptual cross-sectional view taken along line 5-5 of FIG. 3.
Figure 6:
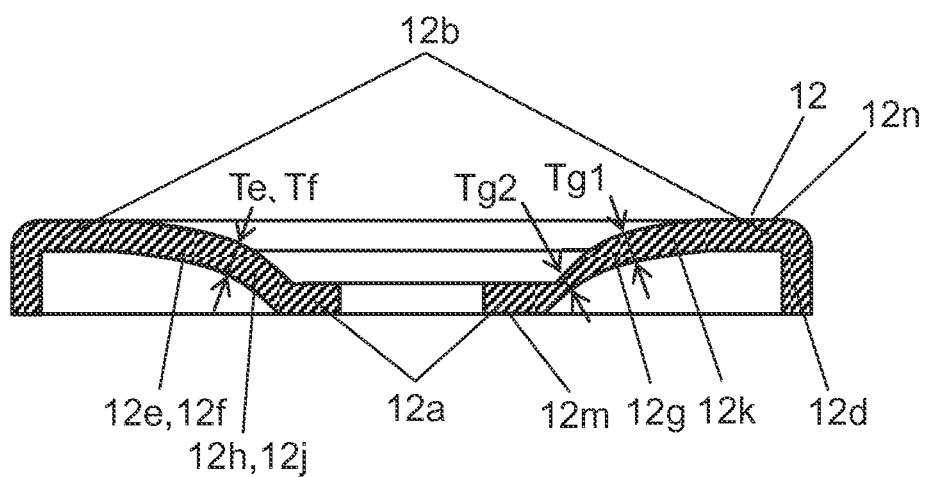
FIG. 6 is another conceptual cross-sectional view taken along line 6-6 of FIG. 3.

FIG. 1 is a cross-sectional view of the motor according to the first embodiment of the invention. FIG. 2 is an enlarged cross-sectional view of a principal part of the motor. FIG. 3 is a perspective view of a washer of the motor. FIG. 4 is a plan view of the washer of the motor. FIG. 5 is a conceptual cross-sectional view taken along line 5-5 of FIG. 3. FIG. 6 is another conceptual cross-sectional view taken along line 6-6 of FIG. 3.

As shown in FIG. 1, motor 1 according to the first embodiment of the present invention includes rotor 8, bearing 11, washer 12 serving as a pressurizing spring, and yoke 9.

Rotor 8 includes core 4, and rotary shaft 3 fixed to core 4, and the rotary shaft has the axial center of the core as an axial center thereof. Bearing 11 includes inner ring 11a having an upper end surface in a direction where core 4 is located, outer ring 11b, and balls 11c located between inner ring 11a and outer ring 11b. Washer 12, which serves as the pressurizing spring, and into which the rotary shaft 3 is inserted, is located between core 4 and bearing 11. Washer 12 provides a bias force in the axial direction of rotary shaft 3. Yoke 9 includes bearing holding part 9a to hold bearing 11. Yoke 9 rotatably holds rotor 8 via bearing 11.

As shown in FIG. 2, outer ring 11b is pressed to fit into bearing holding part 9a, Inner ring 11a is fitted onto rotary shaft 3 with gap 15 therebetween. Inner ring 11a is in contact with washer 12 serving as the pressurizing spring at upper end surface 11d of inner ring 11a. Washer 12 serving as the pressurizing spring applies different bias forces to upper end surface 11d.

With this configuration, inner ring 11a is slightly inclined relative to rotary shaft 3, so that the inner peripheral surface of inner ring 11a is in partial contact with the outer peripheral surface of rotary shaft 3. That is, washer 12 applies the bias forces to inner ring 11a, resulting in the inclination of inner ring 11a, which causes inner ring 11a to be pressed against rotary shaft 3 by a predetermined force. Therefore, the positional elation between inner ring 11a and rotary shaft 3 becomes stable.

This prevents the inner peripheral surface of inner ring 11a and the peripheral surface of rotary shaft 3 from being in sliding contact with each other. Therefore, the noise is eliminated which is caused by the sliding contact between the inner peripheral surface of inner ring 11a and the outer peripheral surface of rotary shaft 3.

Moreover, washer 12 pressurizes inner ring 11a. The pressurization to inner ring 11a suppresses backlashes of bearing 11 in the axial direction. That is, such the appropriate pressurization to inner ring 11a allows the motor capable of reducing the noise and vibration attributed to bearing 11.

A further description will be made in more detail.

Note that, in the following descriptions, the direction from the rotor toward a bracket is designated as a direction toward the output side of the rotary shaft. The direction from the rotor toward the yoke is designated as a direction toward the opposite output side of the rotary shaft.

As shown in FIG. 1, motor 1 according to the first embodiment of the present invention includes rotor 8 described in the following explanation. That is, rotor 8 includes core 4, winding 2, rotary shaft 3, and commutator 7.

Core 4 has a substantially circular-arc shape, and includes a plurality of slots. Winding 2 is wound and accommodated in the slots. Rotary shaft 3 is fixed, penetrating core 4 in the axial direction. Commutator 7 is fixed to rotary shaft 3. With commutator 7, end portions of winding 2 are electrically coupled.

Rotor 8 is rotatably accommodated in yoke 9 having a cylindrical shape. Yoke 9 has the hollow cylindrical shape with a bottom portion. To the inner peripheral surface of yoke 9, a plurality of permanent magnets 13 are firmly fixed. To the open end of yoke 9, bracket 10 is attached. Yoke 9 and bracket 10 constitute a case.

Yoke 9 includes bearing holding part 9a at the center of the bottom portion of the yoke. In bearing holding part 9a, bearing 11 on the opposite output side is held. On the other hand, in bearing holding part 10a included in bracket 10, bearing 6 on the output side is held. Rotary shaft 3 is rotatably held to the case with two bearings 6 and 11.

Bearing 11 includes inner ring 11a, outer ring 11b, and balls 11c that are inserted between inner ring 11a and outer ring 11b. Outer ring 11b is pressed to fit into bearing holding part 9a formed in a cylindrical shape in yoke 9, and is held there. Inner ring 11a is fitted onto rotary shaft 3 with gap 15 therebetween such that the inner ring 11a is movable in the axial direction of rotary shaft 3. On the output side of rotary shaft 3, outer ring 6b included in bearing 6 is pressed to fit into bearing holding part 10a and is held there.

Bracket 10 includes brush holders 14. Brush holders 14 are attached such that brushes 5 are movable and in sliding contact with commutator 7. A load is coupled with the output side of rotary shaft 3. A drive current flows to rotor 8 via brushes 5 to rotate rotor 8. The rotation of rotor 8 rotates and drives the load that is coupled with the output side of rotary shaft 3.

Between core 4 included in rotor 8 and inner ring 11a included in bearing 11, there exists washer 12 inserted onto rotary shaft 3. Washer 12 is the pressurizing spring. Washer 12 is attached in a state of being compressed in the axial direction. Washer 12 applies the bias forces acting on inner ring 11a, in the direction along the axial direction.

Here, a description will be made regarding a specific example of the washer serving as the pressurizing spring that plays an important role in the motor according to the first embodiment of the present invention.

As shown in FIG. 2, core 4 includes lower end surface 4a in the direction in which bearing 11 is located.

As shown in FIGS. 2 to 6, washer 12 includes inner-ring portion 12a, outer-ring portion 12b, and connecting portions 12e, 12f, and 12g.

As shown in FIG. 2, inner-ring portion 12a is in contact with upper end surface 11d included in inner ring 11a at bearing-side surface 12m of inner-ring portion 12a. Outer-ring portion 12b is in contact with lower end surface 4a included in core 4 at core-side surface 12n of the outer-ring portion 12b. Each of connecting portions 12e, 12f, and 12g has an elastic force. Each of connecting portions 12e, 12f, and 12g couples inner-ring portion 12a to outer-ring portion 12b. In washer 12, a plurality of connecting portions 12e, 12f, and 12g is formed.

As shown in FIG. 4, inner-ring portion 12a is coupled with connecting portions 12e, 12f, and 12g at inner-side connecting positions Pea, Pfa, and Pga, respectively. Outer-ring portion 12b is coupled with connecting portions 12e, 12f, and 12g at outer-side connecting positions Peb, Pfb, and Pgb, respectively.

With this configuration, stress applied on washer 12 is distributed among the plurality of connecting portions 12e, 12f, and 12g. Therefore, a degree of flexibility in pressurization provided by washer 12 can be made larger. In other words, by changing the widths of connecting portions 12e, 12f, and 12g, a wider range of the stresses become applicable. The larger degree of the flexibility in the pressurization provided by washer 12 makes it possible to use washers 12, which are manufactured under the same specifications, in motors having a large size to a small size.

A more specific description will be made regarding the washer used in the motor according to the first embodiment of the present invention. In the plurality of the connecting portions, the elastic force of at least one of the connecting portions is different in strength from the elastic forces of the other connecting portions.

As shown in FIGS. 3 and 4, connecting portions 12e, 12f, and 12g are formed of band-like bodies 12h, 12j, and 12k having constant widths of We, Wf, and Wg, respectively. For example, width Wg of band-like body 12k that forms connecting portion 12g, i.e. at least one of the connecting portions, is different from widths We and Wf of band-like bodies 12h and 12j that form connecting portions 12e and 12f, i.e. the other connecting portions, respectively.

Alternatively, as shown in FIG. 5, connecting portions 12e, 12f, and 12g are formed of band-like bodies 12h, 12j, and 12k having constant thicknesses of Te, Tf, and Tg, respectively. For example, thickness Tg of band-like body 12k that forms connecting portion 12g, i.e. at least one of the connecting portions, is different from thicknesses Te and Tf of band-like bodies 12h and 12j that form connecting portions 12e and 12f, i.e. the other connecting portions, respectively.

With this configuration, such a simple configuration of washer 12 allows the bias forces of different strengths which are applied along the circumferential direction of the inner ring included in the bearing.

Next, a description will be made regarding the shape of a washer which provides more outstanding advantages.

As shown in FIGS. 3 and 4, the plurality of inner-side connecting positions Pea, Pfa, and Pga are located at substantially regular intervals along the circumferential direction with the rotary shaft as a center, in a first orthogonal plane orthogonal to the axial direction of the rotary shaft. The plurality of outer-side connecting positions Peb, Pfb, and Pgb are located at substantially regular intervals along the circumferential direction with the rotary shaft as a center, in a second orthogonal plane orthogonal to the axial direction of the rotary shaft.

For example, inner-side connecting position Pea and outer-side connecting position Peb form a pair, and are both ends of connecting portion 12e which is one of the connecting portions. Such inner-side connecting position Pea and outer-side connecting position Peb are located in a twisted manner at a predetermined angle θ therebetween, along the circumferential direction with the rotary shaft as the center, in the first and second orthogonal planes, respectively.

This configuration allows washer 12 to be made more compact. In addition, washer 12 can be made to have the appropriate elastic force.

Hereinafter, a further detailed description will be made regarding the specific configuration of washer 12. It is noted, however, that FIG. 2 is a view to schematically illustrate the principal part of the motor according to the first embodiment of the present invention, for easy understanding of the description.

As shown in FIG. 2, washer 12 includes inner-ring portion 12a, outer-ring portion 12b, and, connecting portions 12e, 12f, and 12g. Inner-ring portion 12a comes into contact with upper end surface 11d of inner ring 11a included in bearing 11. Outer-ring portion 12b comes into contact with lower end surface 4a of core 4 included in rotor 8. Three connecting portions 12e, 12f, and 12g each couple inner-ring portion 12a to outer-ring portion 12b. Three connecting portions 12e, 12f, and 12g each have the elastic force. As shown in FIG. 4, connecting portions 12e, 12f, and 12g are formed of band-like bodies 12h, 12j, and 12k which have constant widths of We, Wf, and Wg, respectively.

Inner-ring portion 12a and outer-ring portion 12b are formed concentrically, with the center of washer 12 as their common center. In the absence of an external force, that is, in the state of washer 12 not being shrunk in the up-and-down direction, outer-ring portion 12b is lifted toward the output side by a predetermined distance relative to inner-ring portion 12a, which is caused by connecting portions 12e, 12f, and 12g.

In this way, inner-ring portion 12a and outer-ring portion 12b are coupled with each other via three connecting portions 12e, 12f, and 12g. This allows the stress applied on washer 12 to be distributed among connecting portions 12e, 12f, and 12g. Therefore, the degree of flexibility in the pressurization provided by washer 12 can be made larger. Such the larger degree of flexibility in the pressurization provided by washer 12 makes it possible to use washers 12, which are manufactured under the same specifications, in motors having a large size to a small size.

As shown in FIG. 4, three connecting portions 12e, 12f, and 12g are coupled with inner-ring portion 12a at inner-side connecting positions Pea, Pfa, and Pga, respectively. Inner-side connecting positions Pea, Pfa, and Pga are disposed at substantially regular intervals along the circumferential direction of inner-ring portion 12a. In the same way, three connecting portions 12e, 12f, and 12g are coupled with outer-ring portion 12b at outer-side connecting positions Peb, Pfb, and Pgb, respectively. Outer-side connecting positions Peb, Pfb, and Pgb are disposed at substantially regular intervals along the circumferential direction of outer-ring portion 12b. Here, for example, inner-side connecting position Pea and outer-side connecting position Peb form a pair, and are Both ends of connecting portion 12e which is one of the connecting portions. Such the pair of inner-side connecting position Pea and outer-side connecting position Peb are disposed at a predetermined angle θ therebetween along the circumferential direction.

With this configuration, connecting portion 12e has a twisted, substantially S-shaped form. Accordingly, in washer 12, connecting portion 12e can be made to secure a predetermined length, with the distance between inner-ring portion 12a and outer-ring portion 12b being kept small. Such the predetermined length of connecting portion 12e allows connecting portion 12e to have an appropriate elastic force. This also holds for connecting portions 12f and 12g, i.e. the other connecting portions. In accordance with this configuration, washer 12 can be made to have the appropriate elastic force, while being made compact.

In addition, as shown in FIG. 4, width Wg of connecting portion 12g is configured to be smaller than widths We and Wf of the other two connecting portions 12e and 12f, respectively. With this configuration, connecting portion 12g has a smaller elastic force than those of the other two connecting portions 12e and 12f.

Next, a description will be regarding other embodiments, which exhibit outstanding advantages, of the washer serving as the pressurizing spring used in the motor according to the first embodiment of the present invention.

As shown in FIG. 3, washer 12 serving as the pressurizing spring includes projection portion 12d that protrudes from the outer periphery of outer-ring portion 12b in the direction opposite to the core-side surface 12n side, i.e. in the direction toward bearing-side surface 12m. Projection portion 12d may be cylindrical.

With this configuration, outer-ring portion 12b has a larger thickness, resulting in an increased strength of outer-ring portion 12b. The increased strength allows washer 12 serving as the pressurizing spring to apply the stable bias forces to the inner ring of the bearing, when the rotor rotates.

Moreover, a detailed description will be made with reference to the drawings.

As shown in FIGS. 2 and 3, outer-ring portion 12b includes annular ring portion 12c and projection portion 12d. Projection portion 12d is cylindrical and protrudes from the outer periphery of annular ring portion 12c toward the opposite output side in the axial direction of rotary shaft 3. Outer-ring portion 12b is configured to have an L-shaped cross-section along the axial direction of the rotary shaft. Such projection portion 12d of outer-ring portion 12b allows an increased thickness of outer-ring portion 12b, in the direction along the axial direction of the rotary shaft. In particular, the increased thickness of the outer periphery of outer-ring portion 12b provides an advantage of an increased strength of outer-ring portion 12b. Consequently, because of the increased strength of outer-ring portion 12b, washer 12 is capable of stably applying the bias forces to inner ring 11a, even when rotor 8 rotates.

As shown in FIG. 2, washer 12 configured as described above is inserted between inner ring 11a and core 4, with the washer being shrunk. Washer 12 applies the bias forces of different strengths to inner ring 11a, along the circumferential direction of inner ring 11a that is in contact with washer 12.

That is, the elastic forces of connecting portions 12e and 12f having the larger widths are stronger than that of connecting portion 12g having the smaller width. Therefore, bias forces Fb are each stronger than bias force Fc. Bias forces Fb by inner-ring portion 12a acts on inner ring 11a at the sides which inner-ring portion 12a is in contact with respective connecting portions 12e and 12f, while bias force Fc by inner-ring portion 12a acts on inner ring 11a at the side on which inner-ring portion 12a is in contact with connecting portion 12g.

As a result, inner ring 11a is slightly tilted to and in contact with rotary shaft 3. Therefore, the inner peripheral surface of inner ring 11a comes into contact with the outer peripheral surface of rotary shaft 3, at two locations designated as location A and location B indicated by dotted lines in the Figure. In other words, distances d3 and d4 each become equal to zero at locations A and B, respectively, where the d3 and d4 are each a distance between the inner peripheral surface of inner ring 11a and the outer peripheral surface of rotary shaft 3.

Then, the bias forces applied to inner ring 11a by washer 12 cause inner ring 11a to be tilted, which in turn causes the inner peripheral surface of inner ring 11a to be pushed against the outer peripheral surface of rotary shaft 3 by a predetermined force. Therefore, the positional relation between inner ring 11a and rotary shaft 3 becomes stable.

As a result, inner ring 11a and rotary shaft 3 are prevented from being in sliding contact with each other. Therefore, the noise attributed to such the sliding contact between inner ring 11a and rotary shaft 3 does not occur.

Moreover, as shown in FIG. 2, washer 12 used in the motor according to the embodiment, pressurizes inner ring 11a via bias forces Fb and Fc that act toward the opposite output side. Such the pressurization applied to inner ring 11a eliminates the gaps in the inside of bearing 11, that is, the gap between inner ring 11a and balls 11c and the gap between outer ring 11b and balls 11c. Therefore, the noise and vibration in the axial direction are suppressed which are caused by backlashes attributed to the gaps. In addition, this results in an improved, lifetime of bearing 11.

As described above, according to the first embodiment, on the plane where washer 12 is in contact with inner ring 11a, inner ring 11a is applied with the bias forces of different strengths by washer 12, along the circumferential direction with the axial direction as a center. This causes inner ring 11a to be tilted relative to rotary shaft 3, which in turn causes the outer peripheral surface of rotary shaft 3 to be in contact with parts of the inner peripheral surface of inner ring 11a. That is, inner ring 11a is tilted and pushed against rotary shaft 3 by a constant force attributed to the bias forces applied by the washer. Then, the positional relation between inner ring 11a and rotary shaft 3 becomes stable. Therefore, this prevents the inner peripheral surface of inner ring 11a from being in sliding contact with the outer peripheral surface of rotary shaft 3. As a result, the noise is reduced which is attributed to such the sliding contact. In addition, this prevents a decrease in lifetime of inner ring 11a and rotary shaft 3 due to the friction therebetween.

Moreover, inner ring 11a is pressurized by washer 12 toward the opposite output side. The pressurization eliminates the gaps included in bearing 11, i.e. the gap between inner ring 11a and balls 11c and the gap between outer ring 11b and balls 11c. Accordingly, the backlashes of bearing 11 in the axial direction are suppressed. That is, washer 12 used in the motor according to the first embodiment of the present invention is capable of reducing the noise and vibration occurring in bearing 11, as well as capable of pressurizing bearing 11 appropriately.

Note that, in the above descriptions, in washer 12 used in the embodiment, inner-ring portion 12a and outer-ring portion 12b are coupled with each other via three connecting portions 12e, 12f, and 12g that each have the elastic force. In particular, the embodiment is exemplified by the case where connecting portion 12g, which is one of three connecting portions 12e, 12f, and 12g, has the different elastic force from those of the others. In order to obtain the same functional advantages, the number of the connecting portions included in the washer may be larger than three. Moreover, among the plurality of the connecting portions included in the washer, at least one of the connecting portions may have a different elastic force from those of the other connecting portions. Specifically, in the case of the washer having five connecting portions, two of the connecting portions may have a different force from those of the others, for example.

Moreover, in the above descriptions, in washer 12 used in the embodiment, connecting portion 12g, which is one of connecting portions 12e, 12f, and 12g, is made to have the smaller width than those of the others. This is responsible for the different elastic forces of connecting portions 12e, 12f, and 12g. In order to obtain the same advantages, the thickness of connecting portion 12g included in the washer may be made smaller. In this case, as shown in FIG. 5, thickness Tg of connecting portion 12g may be made uniformly smaller. Alternatively, the connecting portion may include locally smaller thicknesses, as indicated, by thicknesses Tg1 and Tg2 shown in FIG. 6.

In other words, the washer used in the embodiment is only required to have the configuration in which, in the plurality of the connecting portions that each couple between the inner-ring portion and the outer-ring portion, at least one of the connecting portions has the elastic force different from those of the others.

INDUSTRIAL APPLICABILITY

The present invention, being capable of effectively reducing noise and vibration that are caused by their bearings, is useful especially for electric motors in which high quality is required.

The invention claimed is:
1. A motor comprising:
a rotor including:
a core; and
a rotary shaft fixed to the core, the rotary shaft having an axial center thereof that coincides with an axial center of the core;

a bearing including:
   an inner ring having an upper end surface in a direction toward a location of the core;
   an outer ring; and
   balls between the inner ring and the outer ring;
a pressurizing spring, into which the rotary shaft is inserted, located between the core and the bearing, for applying a bias force in an axial direction of the rotary shaft; and
a yoke including a bearing holding part to hold the bearing, and rotatably holding the rotor via the bearing,
wherein the outer ring is pressed to fit into the bearing holding part;
the inner ring is fitted onto the rotary shaft with a gap therebetween, the upper end surface of the inner ring being in contact with the pressurizing spring; and
the pressurizing spring applies the bias forces of different strengths onto a contact surface of the upper end surface being in contact with the pressurizing spring, along a circumferential direction with the axial direction as a center, and
wherein the core includes a lower end surface in a direction toward a location of the bearing;
the pressurizing spring includes:
   an inner-ring portion having a bearing-side surface in contact with the upper end surface;
   an outer-ring portion having a core-side surface in contact with the lower end surface; and
   a plurality of connecting portions each having an elastic force and coupling the inner-ring portion with the outer-ring portion,
the inner-ring portion is coupled with the plurality of connecting portions at a plurality of inner-side connecting positions, respectively, and
the outer-ring portion is coupled with the plurality of connecting portions at a plurality of outer-side connecting positions, respectively, and
wherein the elastic force of at least one of the plurality of the connecting portions is different in strength from the elastic forces of the other connecting portions.

2. The motor according to claim 1,
wherein each of the plurality of the connecting portions is formed of a band-like body having a constant width, and
the width of the band-like body forming at least one of the connecting portions is different from the widths of the band-like bodies forming the other connecting portions.

3. The motor according to claim 2,
wherein the plurality of the inner-side connecting positions are located at substantially regular intervals, along a circumferential direction with the rotary shaft as a center, in a first orthogonal plane orthogonal to the axial direction of the rotary shaft,
the plurality of the outer-side connecting positions are located at substantially regular intervals, along the circumferential direction with the rotary shaft as the center, in a second orthogonal plane orthogonal to the axial direction, and
each one of the plurality of the inner-side connecting positions and a corresponding one of the plurality of the outer-side connecting positions, forming a pair and being both ends of a corresponding one of the plurality of connecting portions, are located in a twisted manner at a predetermined angle therebetween, along the circumferential direction with the rotary shaft as the center, in the first and second orthogonal planes, respectively.

4. The motor according to claim 1,
wherein, each of the plurality of the connecting portions is formed of a band-like body having a constant thickness, and
the thickness of the band-like body forming at least one of the connecting portions is different from the thicknesses of the band-like bodies forming the other connecting portions.

5. The motor according to claim 4,
wherein the plurality of the inner-side connecting positions are located at substantially regular intervals, along a circumferential direction with the rotary shaft as a center, in a first orthogonal plane orthogonal to the axial direction of the rotary shaft,
the plurality of the outer-side connecting positions are located at substantially regular intervals, along the circumferential direction with the rotary shaft as the center, in a second orthogonal plane orthogonal to the axial direction, and
each one of the plurality of the inner-side connecting positions and a corresponding on of the plurality of the outer-side connecting positions, forming a pair and being both ends of a corresponding one of the plurality of connecting portions, are located in a twisted manner at a predetermined angle therebetween, along the circumferential direction with the rotary shaft as the center, in the first and second orthogonal planes, respectively.

6. The motor according to claim 1,
wherein the plurality of the inner-side connecting positions are located at substantially regular intervals, along a circumferential direction with the rotary shaft as a center, in a first orthogonal plane orthogonal to the axial direction of the rotary shaft,
the plurality of the outer-side connecting positions are located at substantially regular intervals, along the circumferential direction with the rotary shaft as the center, in a second orthogonal plane orthogonal to the axial direction, and
each one of the plurality of the inner-side connecting positions and a corresponding one of the plurality of the outer-side connecting positions, forming a pair and being both ends of a corresponding one of the plurality of connecting portions, are located in a twisted manner at a predetermined angle therebetween, along the circumferential direction with the rotary shaft as the center, in the first and second orthogonal planes, respectively.

7. The motor according to claim 1, wherein the pressurizing spring further includes a projection portion protruding from an outer periphery of the outer-ring portion toward a direction opposite to the core-side surface, in the axial direction of the rotary shaft.

* * * * *